(12) United States Patent
Young

(10) Patent No.: US 7,653,315 B2
(45) Date of Patent: Jan. 26, 2010

(54) BI-DIRECTIONAL OPTICAL MONITOR INTERCONNECT

(75) Inventor: Bruce A. Young, Le Mars, IA (US)

(73) Assignee: Gateway, Inc., North Sioux City, SD (US)

( * ) Notice: Subject to any disclaimer, the term of this patent is extended or adjusted under 35 U.S.C. 154(b) by 641 days.

(21) Appl. No.: 10/347,784

(22) Filed: Jan. 21, 2003

(65) Prior Publication Data

US 2004/0141751 A1   Jul. 22, 2004

(51) Int. Cl.
*H04B 10/12* (2006.01)

(52) U.S. Cl. ............................ 398/141; 398/41; 398/42; 398/107; 398/139; 398/140; 345/204; 385/53; 385/100

(58) Field of Classification Search ................... 398/41, 398/107, 135–144, 76, 154; 345/8, 150, 345/204, 213, 601; 359/173, 245; 385/8–10, 385/24, 53, 88–90; 235/454; 370/241, 445
See application file for complete search history.

(56) References Cited

U.S. PATENT DOCUMENTS

| | | | | |
|---|---|---|---|---|
| 4,149,186 A | * | 4/1979 | Chung et al. ................. 348/478 |
| 4,330,173 A | * | 5/1982 | Oestreich ..................... 385/113 |
| 4,767,168 A | * | 8/1988 | Grandy ......................... 385/53 |
| 4,863,233 A | | 9/1989 | Nienaber et al. ........... 350/96.2 |
| 5,132,827 A | * | 7/1992 | Smith et al. .................. 398/147 |
| 5,462,244 A | * | 10/1995 | Van Der Hoek et al. .. 246/122 R |
| 5,535,033 A | * | 7/1996 | Guempelein et al. ........ 398/114 |
| 5,535,968 A | * | 7/1996 | Mokkapati et al. ............. 246/3 |
| 5,933,553 A | * | 8/1999 | Ziemann ....................... 385/24 |
| 5,948,091 A | * | 9/1999 | Kerigan et al. ................ 710/10 |
| 5,963,193 A | * | 10/1999 | Knox et al. .................. 345/601 |
| 6,016,211 A | | 1/2000 | Szymanski et al. .......... 359/117 |
| 6,031,645 A | * | 2/2000 | Ichikawa ..................... 398/41 |
| 6,118,918 A | * | 9/2000 | Gross et al. .................. 385/138 |
| 6,151,334 A | | 11/2000 | Kim et al. .................... 370/468 |
| 6,211,978 B1 | * | 4/2001 | Wojtunik ....................... 398/9 |
| 6,295,053 B1 | | 9/2001 | Tsai et al. .................... 345/204 |
| 6,307,543 B1 | | 10/2001 | Martin ....................... 345/213 |

(Continued)

OTHER PUBLICATIONS

Digital Visual Interface, Revision 1.0; Digital Display Working Group; Apr. 2, 1999.

(Continued)

*Primary Examiner*—Ken N Vanderpuye
*Assistant Examiner*—Li Liu
(74) *Attorney, Agent, or Firm*—Pearne & Gordon LLP

(57) ABSTRACT

The present invention is directed to a bi-directional optical monitor interconnect. The bi-directional monitor interconnect of the present invention includes an optical conductor with a first and second end. Disposed on the first end of the optical conductor is a first optical communication device and a first optical receiving device. Disposed on the second end of the optical conductor is a second optical communication device and a second optical receiving device. The first and second optical communication devices are capable of transmitting data over an optical connection. The first optical communication device is suitable for communicating via a first wavelength and the second optical communication device is capable of communicating over a second wavelength. The first receiving device is capable converting the second wavelength into electrical signals and the second receiving device is capable of converting the first wavelength into electrical signals.

50 Claims, 4 Drawing Sheets

U.S. PATENT DOCUMENTS

| | | | |
|---|---|---|---|
| 6,310,345 B1 * | 10/2001 | Pittman et al. | 250/334 |
| 6,336,192 B1 | 1/2002 | Sakamoto et al. | 713/503 |
| 6,446,867 B1 * | 9/2002 | Sanchez | 235/454 |
| 6,502,997 B1 * | 1/2003 | Lee et al. | 385/88 |
| 6,538,815 B1 * | 3/2003 | Cao | 359/484 |
| 6,693,561 B2 * | 2/2004 | Kaplan | 340/984 |
| 6,754,240 B1 * | 6/2004 | Crummey et al. | 370/537 |
| 6,839,780 B2 * | 1/2005 | Brebner et al. | 710/62 |
| 6,943,755 B1 * | 9/2005 | Bartow | 345/8 |
| 2002/0063933 A1 * | 5/2002 | Maeda et al. | 359/173 |
| 2002/0102072 A1 * | 8/2002 | Chan et al. | 385/89 |
| 2002/0159725 A1 * | 10/2002 | Bucklen | 385/101 |
| 2003/0034963 A1 * | 2/2003 | Moon et al. | 345/204 |
| 2003/0035186 A1 * | 2/2003 | Ide et al. | 359/180 |
| 2003/0142040 A1 * | 7/2003 | Gaydoul et al. | 345/4 |
| 2004/0120720 A1 * | 6/2004 | Chang et al. | 398/139 |

OTHER PUBLICATIONS

Digital Display Working Group Delivers DVI; Digital Display Working Group; Jan. 9, 2002; http://www.ddwg.org.

Delivering the DVI Digital Interface to the CRT Monitor; Silicon Image; Feb. 2000.

Setting the Standard for All-Digital Displays; Silicon Imagine.

Silicon Image Works with Industry Leaders to Spur DVI Adoption; Silicon Image; Jan. 9, 2002; http://www.siimage.com/press/08_27_01.asp.

* cited by examiner

BI-DIRECTIONAL OPTICAL MONITOR INTERCONNECT

FIELD OF THE INVENTION

The present invention generally relates to the field of optical communications and specifically to a bi-directional optical interconnect for a monitor.

BACKGROUND OF THE INVENTION

Increasingly technology is becoming more prevalent in everyday life. As the general level of information handling technology increases, users demand hardware capable of providing high quality output. One such area of user demand is display systems. Users want efficient display systems capable of providing clear images. As information handling technology improves efficient display systems providing high quality output are well received and result in high demand.

In particular, interconnects between information handling systems and display devices cause problems. Output devices, such as monitors, may experience display degradation from electromagnetic interference associated with the interconnect to the information handling system. Display degradation occurs because of high frequency display signals communicated through the wired interconnect. Both analog and digital output signals may cause electromagnetic interference when communicated through wiring such as copper wiring. Electromagnetic interference generated while communicating high frequency output signals through wiring may cause interference resulting in poor image display, particularly for large monitors.

A wired interconnect may experience electromagnetic interference from environmental sources. For example, if an information handling system with a wired interconnect is located in an electromagnetically noisy environment, such as adjacent to high voltage equipment interference may occur resulting in a poor display quality. Display degradation occurs because electromagnetic noise interferes with interconnect communications.

Interconnect communication rates vary. Data communicated from the information handling system to the display device often exceed the rate of communication occurring from the display device to the information handling system. For example, an approximately five gigabit per second communication may occur for a 1600×1200 pixel 32 bit, 85 hertz (Hz) display while communications from the display to the information handling system, such as for providing extended display identification data (EDID), may remain approximately at or below one hundred megabits per second. Because communication between a display and an information handling system may vary depending on the type of communication it is necessary for an interconnect to account for differing bi-directional communication rates.

Therefore, it would be desirable to provide a bi-directional optical interconnect for a monitor.

SUMMARY OF THE INVENTION

Accordingly, the present invention is directed to a bi-directional optical monitor interconnect. The bi-directional optical interconnect of the present invention provides an efficient system for transmitting data between an information handling system and a display device without the electromagnetic interference associated with previously known wired interconnects.

In an aspect of the present invention a bi-directional optical monitor interconnect includes an optical conductor with a first and a second end. Disposed on the first end of the optical conductor is a first optical communication device and a first optical receiving device. Disposed on the second end of the optical communication device is a second optical communication device and a second optical receiving device. In the current aspect the first optical communication device and the second optical receiving device communicate via a first wavelength. The second optical communication device and the first optical receiving device communicate via a second wavelength, such that bi-directional communication is provided.

In a further aspect of the present invention, a bi-directional optical monitor interconnect includes an optical conductor with a first and a second end. Disposed on the first end of the optical conductor is a first optical filter between a first optical receiving device and the optical conductor. Disposed on the second end of the optical conductor is a second optical filter between the optical conductor and a second optical receiving device. The first optical filter is transparent to a second wavelength, such as may be transmitted by a second optical communication device disposed on the second end. The second optical filter is transparent to a first wavelength, such as may be transmitted by a first optical communication device disposed on the first end of the optical conductor.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring generally now to FIGS. 1A through 3, exemplary embodiments of the present invention are shown wherein a bi-directional optical monitor interconnect is discussed. The bi-directional optical interconnect of the present invention provides an efficient system for transmitting data between an information handling system and a display device without the electromagnetic interference problems associated with previous wired interconnects.

Figure 1A:
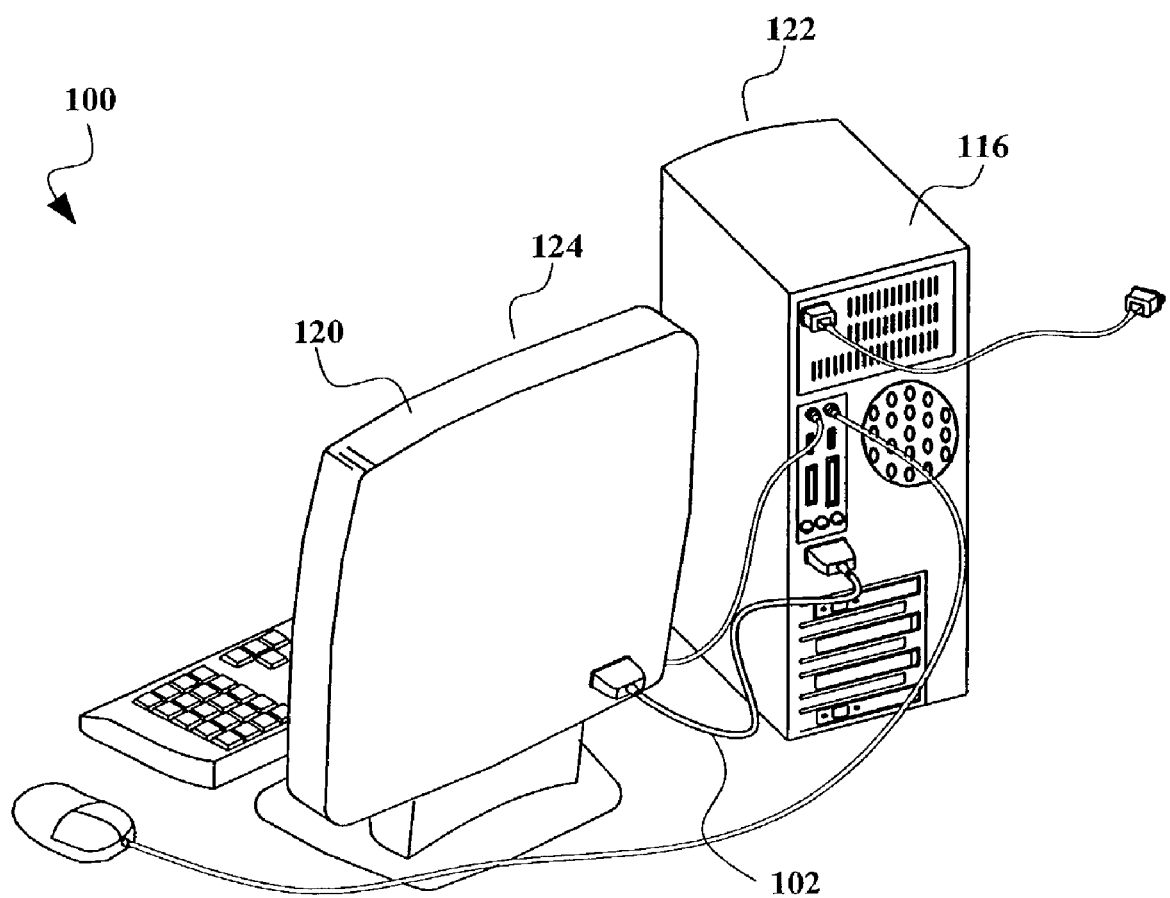
FIG. 1A is a perspective view of an exemplary embodiment wherein a bi-directional optical monitor interconnect is implemented with an information handling system and a monitor.
Figure 1C:
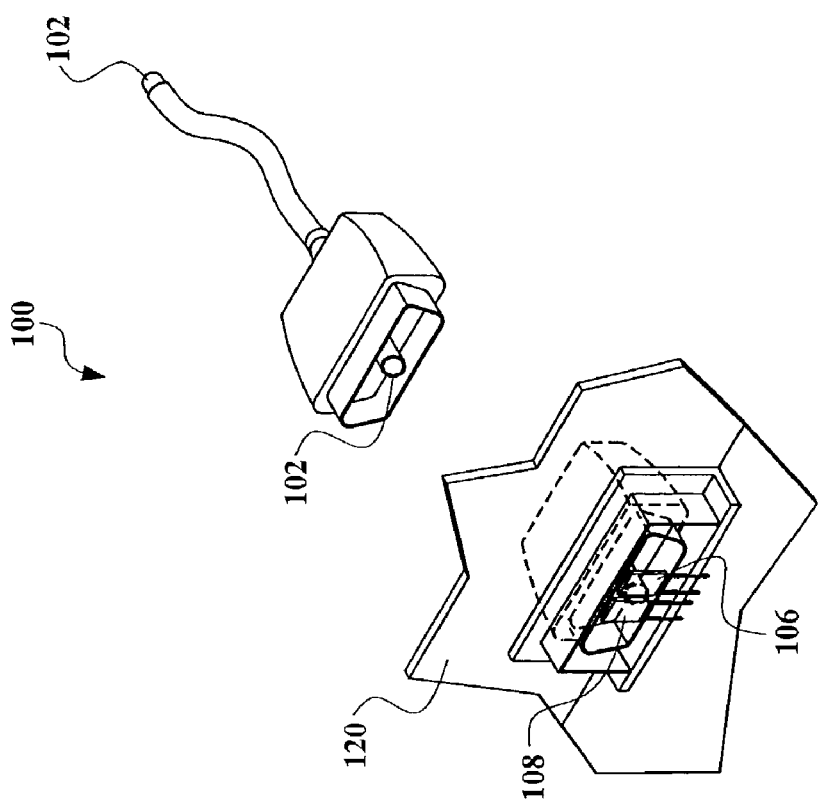
FIG. 1C is a perspective view of an exemplary embodiment wherein a second optical communication device and a second optical receiving device are implemented in a monitor housing.
Figure 1B:
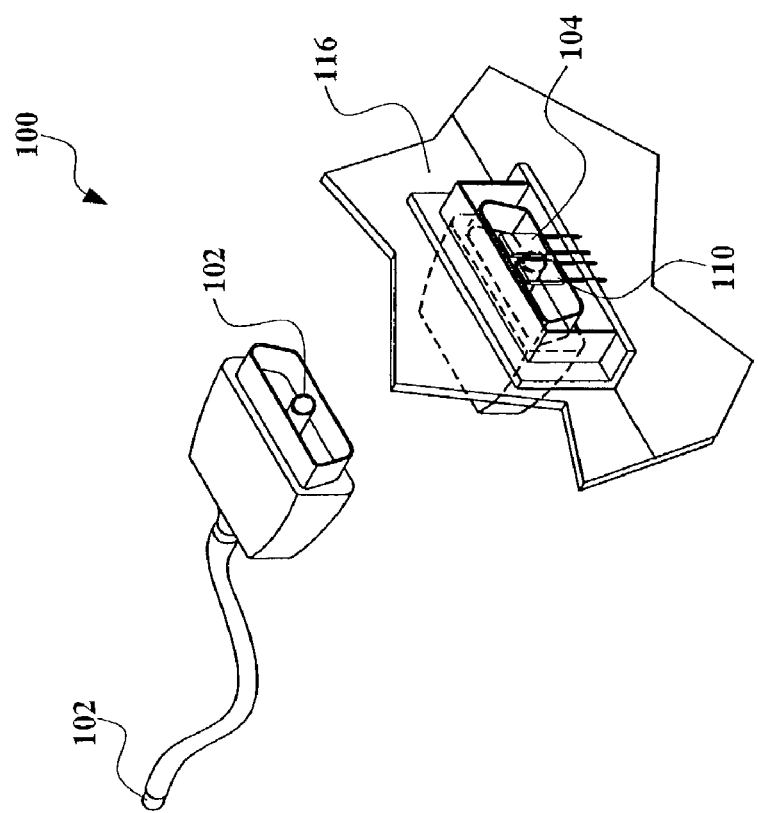
FIG. 1B is a perspective view of an exemplary embodiment wherein a first optical communication device and a first optical receiving device are implemented in an information handling system chassis.

Referring to FIGS. 1A, 1B and 1C, a bi-directional optical monitor interconnect 100 of the present invention is shown. The optical interconnect 100 includes an optical conductor 102. The optical conductor 102 is suitable for conducting light beams coding digital information. Suitable optical conductors include glass fiber, plastic and the like suitable for conducting light signals, as contemplated by one of ordinary skill in the art. For example, an optical conductor in aspects of the present invention is capable of conducting light beams of wavelengths of between approximately 850 nanometers to 1,560 nanometers. The optical conductor 102 has a first and a second end. Communication pairs are formed between corresponding optical communication devices and optical receiving devices disposed on opposite ends of the optical connection thus allowing bi-directional communication.

A first optical communication device 104 is disposed on the first end of the optical conductor 102, such that the first optical communication device is capable of transmitting data over the optical conductor 102. In the present embodiment, the first optical communication device 104 is disposed within the information handling system housing 116.

Figure 2:
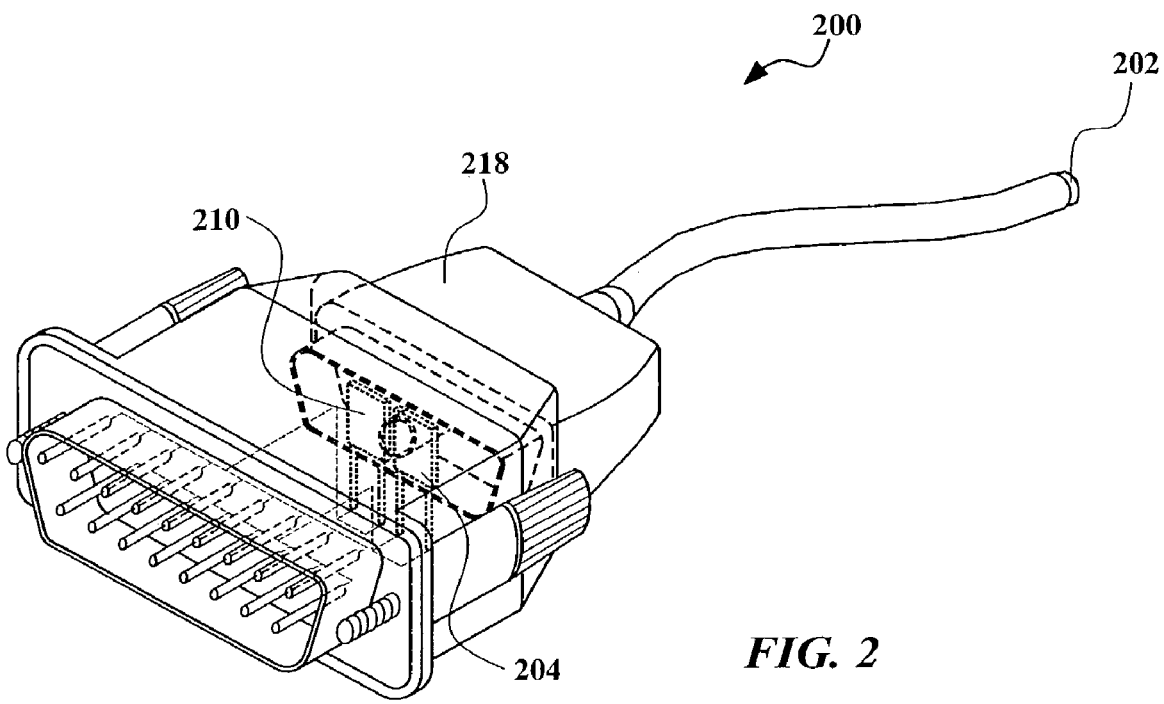
FIG. 2 is a perspective view of an exemplary embodiment wherein a bi-directional optical monitor interconnect includes an optical communication device and an optical receiving device disposed within a cord.

Referring to FIG. 2, in additional embodiments, the first optical communication device 204 is disposed within a cord 218 housing the optical conductor 202. Disposing the first optical communication device in a cord housing the optical conductor allows for retrofitting the bi-directional optical monitor interconnect 200. Thus the bi-directional interconnect 200 may be utilized on legacy systems.

The first optical communication device 104 is capable of transmitting data over an optical connection. Suitable optical communication devices include visual optical sources, diodes, resonance cavity laser diodes, lasers, infrared sources, near infrared sources and the like. The first optical communication device 104 is capable of transmitting data over a specific wavelength and/or a discrete range of wavelengths suitable for communication over the optical conductor 102 as contemplated by one of ordinary skill in the art. In the current orientation of the bi-directional monitor interconnect 100, the first optical communication device is capable of providing image data and/or embedded commands from the information handling system 122 to the monitor 124.

A second optical receiving device 108 is disposed on the second end of the optical conductor 102. The second optical receiving device 108 converts a light beam encoding optical information into electrical signals. In the present embodiment the second optical receiving device 108 is a photoreceptive diode optimized for communication with the first optical communication device 104. Preferably, the first optical communication device 104 and the second optical receiving device 108 are capable of high communication rates, such as above 500 megabit per second.

A second optical communication device 106 is disposed on the second end of the optical conductor 102. The second communication device 106 is capable of transmitting data over the optical conductor 102. The second communication device 106, in the present implementation, is disposed in the monitor housing 120.

In additional embodiments, the second optical communication device is disposed within a cord housing the optical conductor. The arrangement of the second optical communication device, second optical receiving device and the optical conductor are substantially similar to that of the first optical communication device 204, the first optical receiving device 210 and optical conductor 202 disclosed in FIG. 2. Those of skill in the art will appreciate that the physical location of the optical communication/receiving devices may vary while remaining suitably disposed for optical communication without departing from the scope and intent of the present invention. Disposing the second optical communication device in a cord housing the optical conductor allows for retrofitting the bi-directional optical monitor interconnect 200. Thus the bi-directional interconnect 200 may be utilized on legacy systems.

The second optical communication device 106 transmits data over an optical connection, such as the optical conductor 102. Suitable optical communication devices include visual optical sources, diodes, resonance cavity laser diodes, infrared sources, near infrared sources and the like. The second optical communication device 106 is capable of transmitting data over a specific wavelength and/or a discrete range of wavelengths suitable for communication over the optical conductor 102 as contemplated by one of ordinary skill in the art.

The second optical communication device 106 may transmit a wavelength sufficiently different from the wavelength transmitted by the first optical communication device 104 to prevent or minimize interference. Utilizing two different wavelengths between the first communication pair, the first optical communication device and the second optical receiving device, and the second communication pair the second optical communication device and the first optical receiving devices may allow for efficient communication while reducing and/or eliminating interference.

In the current orientation of the bi-directional optical monitor interconnect 100, the second optical communication device 106 is capable of providing monitor data such as extended display identification data (EDID), enhanced extended display identification data (EEDID), and the like.

For example, in a situation where the first optical communication device 104 is communicating higher frequency data, such as image data the first optical communication device 104 may transmit a blue-green wavelength approximately 430 nanometers (nm) through 565 nm while the second optical communication device 106 is transmitting monitor data, the second communication device may transmit an infrared wavelength approximately 700 nm through 1560 nm.

A first optical receiving device 110 is disposed on the first end of the optical conductor 102. The first optical receiving device 108 is capable of converting a light beam encoding optical information into electrical signals. In the present embodiment the first optical receiving device 110 is a photoreceptive diode optimized for communication with the second optical communication device 106.

Monitor data, such as data from the monitor to the information handling system typically does not require as high a communication capacity in comparison to image data, such as data from the information handling system to the monitor. Typically, extended display identification data is efficiently handled at rates less than 100 megabit per second while image data require in excess of 500 megabit per second. Due to manufacturing and cost concerns it may be preferable to utilize an optical communication device and an optical receiving device with a lower communication capacity to reduce costs while retaining sufficient capacity to transmit monitor data while reducing electromagnetic interference. In other words the asymmetric nature of the data transfers between an information handling system and a monitor may not necessitate high bandwidth in both directions. While in some instances asymmetric communication is sufficient, it is within the scope and spirit of the present invention to allow symmetric communication rates.

The optical monitor interconnect of the present invention may be capable of utilization in conformance with at least one the following communication standards or communication schemes transmission minimized differential signaling, low voltage digital signaling, digital video interface, digital interface standard for monitors, plug and play, flat panel display interface two and the like. For example, the optical monitor interconnect may transmit/receive an electrical signal which is within the voltage range required for the communication standard, and the like. Those of skill in the art will appreciate that the optical monitor interconnect may be implemented with devices employing various standards without departing from the spirit and scope of the present invention.

Figure 3:
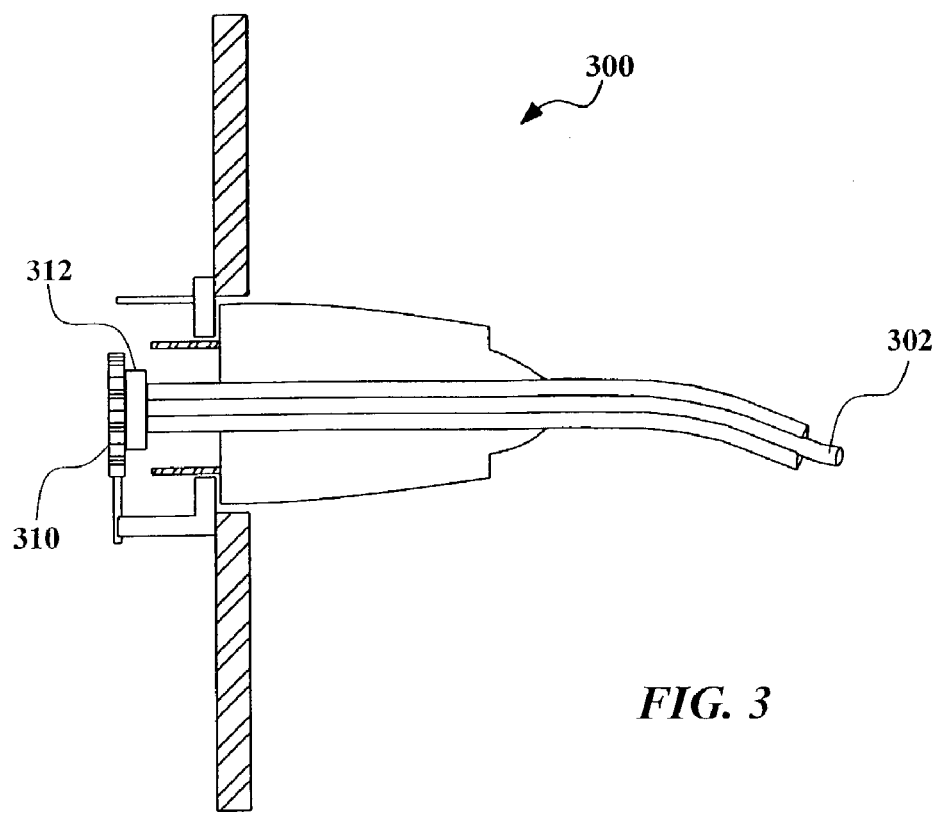
FIG. 3 is a side view of an exemplary embodiment wherein a bi-directional optical monitor interconnect includes an optical filter disposed between an optical conductor and an optical receiving device.

Referring to FIG. 3, in a second aspect of the present invention optical filters are implemented into the bi-directional optical interconnect 300. A first optical filter 312 is disposed between an optical conductor 302 and the first optical receiving device 310. The first optical filter 312 is transparent to the wavelength transmitted by the second optical communication device.

For example, when second optical communication device transmits a wavelength and/or a discrete range of wavelengths in the blue-green region, approximately 430 through 565 nanometers the first optical filter 312 is transparent to blue-green region, approximately 430 through 565 nanometers or a subset thereof. Correspondingly, when the second optical communication device transmits a wavelength and/or a discrete range of wavelengths in the infrared region, approximately 860 through 1560 nm the first optical filter is transparent to wavelengths in the infrared region, approximately 860 through 1560 nanometers or a subset thereof. The second optical filter is implemented in substantially the same way as the first optical filter 312. Utilizing optical filter may further reduce and/or minimize interference and/or allow utilization of wavelengths closer within the electromagnetic spectrum to each other.

Figure 4:
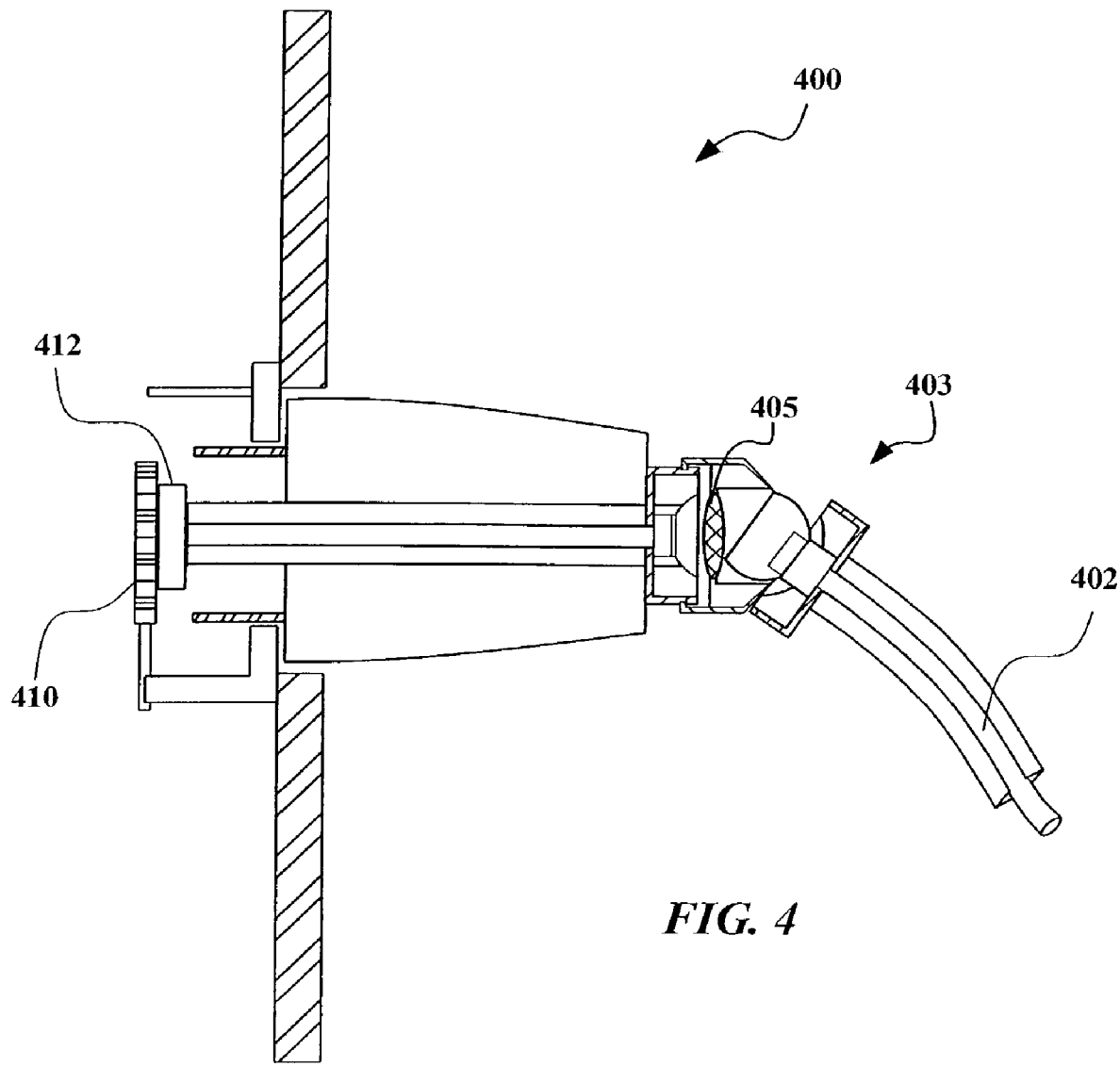
FIG. 4 is a side view of a bi-directional interconnect including an adjustable polarization device.

Referring to FIG. 4, those of ordinary skill in the art will appreciate that any of the embodiments herein may be implemented with a polarization adapter 403 for adjusting the polarization angle of a signal when applicable. For instance, a adapter is capable of permitting rotation of the optical conductor with respect to a connector, such as for connecting to an information handling system, thus a cord containing the bi-directional interconnect may rotate to free tangles or coiling. In further embodiments the adapter includes a rotateable filter 405 capable of adjusting the polarization of the light beam.

It is believed that the bi-directional optical monitor interconnect of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A bi-directional optical monitor interconnect configured between an information handling system and a display device associated with the information handling system, the bi-directional optical monitor interconnect comprising:

an optical fiber with a first and a second end, the optical fiber suitable for conducting a light beam encoding digital information;

a first optical communication device capable of transmitting data over an optical connection suitably disposed for optical communication on the first end of the optical fiber;

a second optical communication device capable of transmitting data over an optical connection suitably disposed for optical communication on the second end of the optical fiber;

a first optical receiving device suitable for converting a light beam encoding digital information to electrical signals, suitably disposed for optical communication on the first end of the optical fiber; and a second optical receiving device suitable for converting a light beam encoding digital information to electrical signals, suitably disposed for optical communication on the second end of the optical fiber;

wherein the first optical communication device is suitable for communicating image data via a first wavelength and the second optical communication device is suitable for communicating monitor data via a second wavelength, the image data and the monitor data both traveling through said optical fiber in opposite directions;

a polarization adapter located on an optical cable including said optical fiber, for adjusting signal polarization angle, the polarization adapter further including a rotateable filter for adjusting light beam polarization.

2. The bi-directional optical monitor interconnect of claim 1, wherein the bi-directional communication rate is asymmetric.

3. The bi-directional optical monitor interconnect of claim 2, wherein the second optical communication device and the first optical receiving device communicate at a rate of less than one hundred (100) megabit per second; and wherein the first optical communication device and the second optical receiving device communicate at a rate of greater than five hundred (500) megabit per second.

4. The bi-directional optical monitor interconnect of claim 1, wherein monitor data is at least one of extended display identification data and enhanced extended display identification data.

5. The bi-directional optical monitor interconnect of claim 1, wherein the bi-directional optical monitor interconnect is suitable for utilization in compliance with one of transmission minimized differential signaling, plug and play, flat panel display interface two, low voltage digital signaling, digital video interface and digital interface standard for monitors.

6. The bi-directional optical monitor interconnect of claim 1, wherein the first wavelength is in the range of 430 through 565 nanometers and the second wavelength is in the range of 860 through 1560 nanometers.

7. The bi-directional optical monitor interconnect of claim 1, further comprising a cord suitable for housing the bi-directional optical monitor interconnect.

8. The bi-directional optical monitor interconnect of claim 1, wherein the information handling system comprises a keyboard configured to receive inputs from a user and the display device is configured to display outputs of the information handling system to said user.

9. The bi-directional optical monitor interconnect of claim 1, wherein the optical fiber is configured to carry signals from the first optical communication device to the second optical receiving device in one direction and configured to carry signals from the second optical communication device to the first optical receiving device in an opposite direction.

10. The bi-directional optical monitor interconnect of claim 1, wherein the first wavelength is a different, non-overlapping frequency from the second wavelength to avoid interference between the image data and the monitor data both traveling through said optical fiber in opposite directions.

11. A bi-directional optical monitor interconnect configured between an information handling system and a display device associated with the information handling system, the bi-directional optical monitor interconnect comprising:
   an optical fiber with a first and a second end, the optical fiber suitable for conducting a light beam encoding digital information;
   a first optical communication device capable of transmitting data over an optical connection suitably disposed for optical communication on the first end of the optical fiber;
   a second optical communication device capable of transmitting data over an optical connection suitably disposed for optical communication on the second end of the optical fiber;
   a first optical receiving device suitable for converting a light beam encoding digital information to electrical signals, suitably disposed for optical communication on the first end of the optical fiber;
   a first optical filter transparent to light transmitted by the second optical communication device disposed between the optical fiber and the first optical receiving device;
   a second optical receiving device suitable for converting a light beam encoding digital information to electrical signals, suitably disposed for optical communication on the second end of the optical fiber; and
   a second optical filter transparent to light transmitted by the first optical communication device disposed between the optical fiber and the second optical receiving device;
   wherein the first optical communication device is suitable for communicating image data via a first wavelength and the second optical communication device is suitable for communicating monitor data via a second wavelength, the image data and the monitor data both traveling through said optical fiber in opposite directions;
   a polarization adapter located on an optical cable including said optical fiber, for adjusting signal polarization angle, the polarization adapter further including a rotateable filter for adjusting light beam polarization.

12. The bi-directional optical monitor interconnect of claim 11, wherein the bidirectional communication rate is asymmetric.

13. The bi-directional optical monitor interconnect of claim 12, wherein the second optical communication device and the first optical receiving device communicate at a rate of less than one hundred (100) megabit per second; and
wherein the first optical communication device and the, second optical receiving device communicate at a rate of greater than five hundred (500) megabit per second.

14. The bi-directional optical monitor interconnect of claim 11, wherein monitor data is at least one of extended display identification data and enhanced extended display identification data.

15. The bi-directional optical monitor interconnect of claim 11, wherein the bi-directional optical monitor interconnect is suitable for utilization in compliance with one of transmission minimized differential signaling plug and play, flat panel display interface two, low voltage digital signaling, digital video interface and digital interface standard for monitors.

16. The bi-directional optical monitor interconnect of claim 11, wherein the first wavelength is in the range of 430 through 565 nanometers and the second wavelength is in the range of 860 through 1560 nanometers.

17. The bi-directional optical monitor interconnect of claim 11, further comprising a cord suitable for housing the bi-directional optical monitor interconnect.

18. The bi-directional optical monitor interconnect of claim 11, wherein the information handling system comprises a keyboard configured to receive inputs from a user and the display device is configured to display outputs of the information handling system to said user.

19. The bi-directional optical monitor interconnect of claim 11, wherein the optical fiber is configured to carry signals from the first optical communication device to the second optical receiving device in one direction and configured to carry signals from the second optical communication device to the first optical receiving device in an opposite direction.

20. The bi-directional optical monitor interconnect of claim 11, wherein the first wavelength is a different, non-overlapping frequency from the second wavelength to avoid interference between the image data and the monitor data both traveling through said optical fiber in opposite directions.

21. A bi-directional optical monitor interconnect system comprising:
   a monitor capable of displaying image data;
   an information handling system;
   a bi-directional optical monitor interconnect suitable for connecting to the monitor and the information handling system including:
   an optical fiber with a first and a second end, the optical conductor suitable for conducting a light beam encoding digital information;
   a first optical communication device capable of transmitting data over an optical connection suitably disposed for optical communication on the first end of the optical fiber;
   a second optical communication device capable of transmitting data over an optical connection suitably disposed for optical communication on the second end of the optical fiber;
   a first optical receiving device suitable for converting a light beam encoding digital information to electrical signals, suitably disposed for optical communication on the first end of the optical fiber;
   a first optical filter transparent to light transmitted by the second optical communication device disposed between the optical fiber and the first optical receiving device;
   a second optical receiving device suitable for converting a light beam encoding digital information to electrical signals, suitably disposed for optical communication on the second end of the optical fiber conductor; and
   a second optical filter transparent to light transmitted by the first optical communication device disposed between the optical fiber and the second optical receiving device;
   wherein the first optical communication device is suitable for communicating image data via a first wavelength and the second optical communication device is suitable for communicating monitor data via a second wavelength, the image data and the monitor data both traveling through said optical fiber in opposite directions;

a polarization adapter located on an optical cable including said optical fiber, for adjusting signal polarization angle, the polarization adapter further including a rotateable filter for adjusting light beam polarization.

22. The bi-directional optical monitor interconnect system of claim 21, wherein the bi-directional communication rate is asymmetric.

23. The bi-directional optical monitor interconnect system of claim 22, wherein the second optical communication device and the first optical receiving device communicate at a rate of less than one hundred megabits per second; and
wherein the first optical communication device and the second optical receiving device communicate at a rate of greater five hundred (500) megabit per second.

24. The bi-directional optical monitor interconnect system of claim 21, wherein the first optical communication device is disposed in the information handling system and the second optical communication device is disposed in the monitor.

25. The bi-directional optical monitor interconnect system of claim 21, wherein monitor data is at least one of extended display identification data and enhanced extended display identification data.

26. The bi-directional optical monitor interconnect system of claim 21, wherein the bi-directional optical monitor interconnect is suitable for utilization in compliance with one of transmission minimized differential signaling, plug and play, flat panel display interface two, low voltage digital signaling, digital video interface and digital interface standard for monitors.

27. The bi-directional optical monitor interconnect system of claim 21, wherein the first wavelength is in the range of 430 through 565 nanometers and the second wavelength is in the range of 860 through 1560 nanometers.

28. The bi-directional optical monitor interconnect system of claim 21, further comprising a cord suitable for housing the bi-directional optical monitor interconnect.

29. The bi-directional optical monitor interconnect of claim 21, wherein the information handling system comprises a keyboard configured to receive inputs from a user and the monitor is configured to display outputs of the information handling system to said user.

30. The bi-directional optical monitor interconnect system of claim 21, wherein the optical fiber is configured to carry signals from the first optical communication device to the second optical receiving device in one direction and configured to carry signals from the second optical communication device to the first optical receiving device in an opposite direction.

31. The bi-directional optical monitor interconnect system of claim 21, wherein the first wavelength is a different, non-overlapping frequency from the second wavelength to avoid interference between the image data and the monitor data both traveling through said optical fiber in opposite directions.

32. A bi-directional optical monitor interconnect configured between an information handling system and a display device associated with the information handling system, the bi-directional optical monitor interconnect comprising:
an optical fiber for conducting optical signals the optical fiber having a first and a second end, the optical fiber being suitable for conducting a light beam encoding digital information;
a first means capable of transmitting data over an optical connection suitably disposed for optical communication on the first end of the optical fiber;
a second means capable of transmitting data over an optical connection suitable disposed for optical communication on the second end of the optical fiber;
a first means for receiving an optical communication suitable for converting a light beam at a first wavelength encoding digital information to electrical signals, suitable disposed for optical communication on the first end of the optical fiber; and
a second means for receiving an optical communication suitable for converting a light beam at a second wavelength encoding digital information to electrical signals, suitably disposed for optical communication on the second end of the optical fiber;
wherein first optical transmitting means is suitable for communicating image data via the first wavelength and the second optical transmitting means is suitable for communicating monitor data via the second wavelength, the image data and the monitor data both traveling through said optical fiber in opposite directions;
a polarization adapter located on an optical cable including said optical fiber, for adjusting signal polarization angle, the polarization adapter further including a rotateable filter for adjusting light beam polarization.

33. The bi-directional optical monitor interconnect of claim 32, wherein the bi-directional communication rate is asymmetric.

34. The bi-directional optical monitor interconnect of claim 33, wherein the second optical transmitting means of the first optical receiving means communicate at a rate of less than one hundred (100) megabit per second; and
wherein the first optical communication means and the second optical receiving means communicate at a rate of greater than five hundred (500) megabit per second.

35. The bi-directional optical monitor interconnect of claim 32, wherein monitor data is at least one of extended display identification data and enhanced extended display identification data.

36. The bi-directional optical monitor interconnect of claim 32, wherein the bi-directional optical monitor interconnect is suitable for utilization in compliance with one of transmission minimized differential signaling, plug and play, flat panel display interface two, low voltage digital signaling, digital video interface and digital interface standard for monitors.

37. The bi-directional optical monitor interconnect of claim 32, wherein the first wavelength is in the range of 430 through 565 nanometers and the second wavelength is in the range of 860 through 1560 nanometers.

38. The bi-directional optical monitor interconnect of claim 32, wherein the information handling system comprises a keyboard configured to receive inputs from a user and the display device is configured to display outputs of the information handling system to said user.

39. The bi-directional optical monitor interconnect of claim 32, wherein the optical fiber is configured to carry signals from the first optical transmitting means to the second optical receiving means in one direction and configured to carry signals from the second optical transmitting means to the first optical receiving means in an opposite direction.

40. The bi-directional optical monitor interconnect of claim 32, wherein the first wavelength is a different, non-overlapping frequency from the second wavelength to avoid interference between the image data and the monitor data both traveling through said optical fiber in opposite directions.

41. An information handling system, comprising:

an optical connector located on the information handling system for mating with a bi-directional optical monitor interconnect cable suitable for conducting a light beam encoding digital information to and from a monitor associated with the information handling system through an optical fiber;

an optical communication device disposed for optical communication on the optical connector; and an optical receiving device for converting a light beam encoding digital information to electrical signals, suitably disposed for optical communication on the optical connector;

wherein the optical communication device is suitable for communicating through said optical fiber image data via a first wavelength and the optical receiving device is suitable for receiving through said optical fiber monitor data via a second wavelength, the image data and the monitor data both traveling through said optical fiber in opposite directions;

a polarization adapter located on the optical monitor interconnect cable, for adjusting signal polarization angle, the polarization adapter further including a rotateable filter for adjusting light beam polarization.

42. The information handling system in claim 41, further comprising an optical filter transparent to light the second wavelength.

43. The information handling system of claim 41, wherein the information handling system comprises a keyboard configured to receive inputs from a user and the monitor is configured to display outputs of the information handling system to said user.

44. The information handling system in claim 41, wherein the optical fiber is configured to carry the image data of the first wavelength in one direction and configured to carry the monitor data of the second wavelength in an opposite direction.

45. The information handling system in claim 41, wherein the first wavelength is a different, non-overlapping frequency from the second wavelength to avoid interference between the image data and the monitor data both traveling through said optical fiber cable in opposite directions.

46. A monitor comprising:

an optical connector located on the monitor capable of mating with a bi-directional optical monitor interconnect cable for conducting a light beam encoding digital information to and from an information handling system associated with the monitor through an optical fiber;

an optical receiving device for converting a light beam encoding digital information to electrical signals, suitably disposed for optical communication on the optical connector; and an optical communication device disposed for optical communication on the optical connector;

wherein the optical receiving device is suitable for receiving through said optical fiber image data via a first wavelength and the optical communication device is suitable for sending through said optical fiber monitor data via a second wavelength, the image data and the monitor data both traveling through said optical fiber in opposite directions;

a polarization adapter located on the optical monitor interconnect cable, for adjusting signal polarization angle, the polarization adapter further including a rotateable filter for adjusting light beam polarization.

47. The monitor in claim 46, wherein the optical receiving device utilizes an optical filter transparent to light the first wavelength.

48. The monitor of claim 46, wherein the information handling system comprises a keyboard configured to receive inputs from a user and the monitor is configured to display outputs of the information handling system to said user.

49. The monitor of claim 46, wherein the optical fiber is configured to carry the image data of the first wavelength in one direction and configured to carry the monitor data of the second wavelength in an opposite direction.

50. The monitor in claim 46, wherein the first wavelength is a different, non-overlapping frequency from the second wavelength to avoid interference between the image data and the monitor data both traveling through said optical fiber in opposite directions.

* * * * *